United States Patent Office.

GEORGE S. LEE, OF DENVER, COLORADO.

FIRE-PROOF PAINT.

SPECIFICATION forming part of Letters Patent No. 388,886, dated September 4, 1888.

Application filed November 22, 1887. Serial No. 255,913. (No specimens.)

*To all whom it may concern:*

Be it known that I, GEORGE S. LEE, a citizen of the United States, residing at Denver, in the county of Arapahoe and State of Colorado, have invented new and useful Improvements in Fire-Proof and Preservative Paint, of which the following is a specification.

My invention relates to a new and improved fire-proof and preservative paint for the protection of metallic objects exposed to the weather—as metal roofs, bridges, &c., of timber exposed to the ravages of insects or to dampness and decay, and for the waterproofing of walls, roofs, &c.; and it consists in the composition more fully hereinafter described and claimed.

I use for the solid base of my improved paint what is called "iron slag" or "furnace slag," which is the refuse slag from gold and silver reduction works, and is called "iron slag" from the very large percentage of iron which it contains, varying from thirty-three to fifty per cent. in the form of protoxide of iron, with which is combined a large percentage of silica, lime, &c. While in this material the proportions of the constituents often varies, as shown by the following analysis taken from a number—

|  | No. 1. | No. 2. |
|---|---|---|
| Protoxide of iron | 41.11 | 33.80 |
| Silica | 33.37 | 37.13 |
| Lime | 10.77 | 15.88 |
| Alumina | 12.35 | 9.56 |
| Magnesia | 1.97 | 3.39 |
| Silver | .017 | .026 |
|  | 99.887 | 99.786 | by far the greater portion is composed of iron and silica in such intimate union as to form in effect an iron glass, which I have discovered possesses qualities rendering it especially desirable as the base of a water-proof and preservative composition. This iron slag or glass is reduced to a fine powder prior to its incorporation with the other ingredients. The following are then mixed together. Powdered slag, seventy-five per cent.; talc, five per cent.; fire-slag, (impure from coal measures,) five per cent.; lime, two to three per cent., all being intimately blended and ground together. By heat and agitation there is then incoporated therewith asphalt, ten per cent., and petroleum, (crude,) two per cent. This forms a mastic which is the base or solid part of my improved paint. To this mastic is then added turpentine, oil, or any of the approved liquid vehicles, until the proper degree of consistency is reached. For some purposes, as the spreading of the composition thickly upon walls, &c., as mortar is spread, very little liquid-paint vehicle will be used, while for brush use enough should be added to reduce it to the consistency of ordinary paint.

Instead of the asphalt and slag being first mixed together and then reduced by the addition of proper liquid-paint vehicles, the asphalt may first be reduced with such vehicles, as in the ordinary method of making asphalt paints and varnishes, and so reduced be then mixed with the solid constituents. In either case the invention remains the same—a paint composition consisting, essentially, of this iron slag, asphalt, and a liquid-paint vehicle.

Thus prepared a very valuable water-proof, fire-proof, and preservative paint or mastic is furnished, the iron and silica being so intimately blended that the paint when dry gives a hard glossy and glassy surface, impervious to dampness and to the attacks of insects.

Having thus described my invention, what I claim is—

The paint composition herein described, consisting of iron slag from gold and silver reduction works, talc, fire-clay, lime, asphalt, petroleum, and a liquid vehicle for paint, the slag being pulverized, substantially as described.

In testimony whereof I affix my signature in presence of two witnesses.

GEORGE S. LEE.

Witnesses:
JAMES L. NORRIS,
J. A. RUTHERFORD.